US007927655B2

(12) United States Patent
Lee

(10) Patent No.: US 7,927,655 B2
(45) Date of Patent: Apr. 19, 2011

(54) METHOD FOR FABRICATING DEHUMIDIFYING ELEMENT INCLUDING SUPERABSORBENT POLYMER AND APPARATUS THEREOF

(75) Inventor: Dae-Young Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1035 days.

(21) Appl. No.: 11/489,655

(22) Filed: Jul. 18, 2006

(65) Prior Publication Data
US 2007/0142532 A1    Jun. 21, 2007

(30) Foreign Application Priority Data
Dec. 21, 2005  (KR) .................. 10-2005-0127265

(51) Int. Cl.
*B05D 1/36* (2006.01)
(52) U.S. Cl. ........ 427/201; 427/203; 524/434; 524/435; 524/436; 524/437
(58) Field of Classification Search .......... 524/434–437; 427/201, 203
See application file for complete search history.

(56) References Cited

U.S. PATENT DOCUMENTS
6,376,011 B1 *  4/2002  Reeves et al. ............... 427/185
2006/0173097 A1 *  8/2006  Ahmed et al. ............... 523/200

FOREIGN PATENT DOCUMENTS
KR    2004-0071246    8/2004
* cited by examiner

*Primary Examiner* — Peter D Mulcahy
(74) *Attorney, Agent, or Firm* — North Star Intellectual Property Law, PC

(57) ABSTRACT

A method for preparing a dehumidifying element including a superabsorbent polymer (SAP) comprises mixing SAP particles with inorganic salt particles, exposing the SAP particles and the inorganic salt particles to a high humidity atmosphere thereby absorbing the deliquescent inorganic salt by the SAP, and drying moisture inside the SAP that has absorbed the inorganic salt. Accordingly, an amount of the inorganic salt absorbed by the SAP is minutely controlled thus to precisely control a degree of an ion exchange therebetween, thereby freely controlling a hygroscopic property of the dehumidifying element including the SAP. Furthermore, since the SAP particles and the inorganic salt particles are physically mixed together, the mixture ratio therebetween is entirely uniform, and therefore, the reliability of the product can be obtained.

2 Claims, 5 Drawing Sheets

METHOD FOR FABRICATING DEHUMIDIFYING ELEMENT INCLUDING SUPERABSORBENT POLYMER AND APPARATUS THEREOF

BACKGROUND OF THE INVENTION

1. Field of the Invention

The present invention relates to a method for preparing a dehumidifying element and an apparatus thereof, and more particularly, to a method for preparing a dehumidifying element including a superabsorbent polymer and a hygroscopic salt, and an apparatus thereof capable of precisely controlling the amount of the hygroscopic salt, shortening time involved in the preparation thereof, thereby reducing the preparation cost.

2. Description of the Background Art

A dehumidifying element serves to remove moisture from surroundings by absorbing and holding water vapor, and is widely used in the rainy season or at a place where excessive moisture is undesirable or dry environment is required. To this end, although silica gel has been used, as the silica gel has a limited dehumidifying capacity of at maximum 45% of the dry weight mass thereof, the silica gel cannot maintain an excellent dehumidifying function for a long time.

Accordingly, the applicant of the present invention has devised a dehumidifying element having an absorbing capacity of 100 to 500 percent of the dry mass thereof by using a superabsorbent polymer (SAP), which is disclosed in Korean Patent Publication No. 2004-71246. According to the present invention, the SAP is bonded with a hygroscopic salt such as lithium chloride, thereby increasing the hygroscopic property.

As disclosed in the Korean Patent Publication No. 2004-71246, a method for preparing a dehumidifying element comprises selecting a salt solution, drying a superabsorbent polymer (SAP), contacting the dried SAP to the salt solution, thereby generating hydrogel, and drying the hydrogel. The dried hydrogel is used as the dehumidifying element by being packaged or by being attached according to the purpose of its use.

However, in the conventional method, a significant amount of solvent absorbed into the dehumidifying element (i.e., SAP with a salt) should be removed by an evaporation process, and thus, the conventional method requires a long time and a large energy consumption for the preparation. Furthermore, while the hydrogel is dried, the SAP particles cling to each other to form a large conglomerate. The large conglomerate has to be crushed back into small particles for proper usage.

Additionally, in case that a salt solution having a high concentration is absorbed into the SAP, the SAP absorbs the salt excessively thereby causing deliquescence during the dehumidifying process. On the other hand, if deliquescence occurs, the liquid tends to flow or be entrained into the air stream to cause a loss of the hygroscopic salt resulting in a gradual decrease in the dehumidifying capacity. If the amount of the salt solution contacting the SAP is reduced in order to limit the amount of the salt to be absorbed, the salt solution is not uniformly distributed in the SAP, thereby causing local deliquescence during the dehumidifying process. That is, if the amount of the inorganic salt for enhancing hygroscopic property is not controlled precisely, the dehumidifying element tends to deliquesce during the dehumidifying process.

Additionally, since the SAP comes in contact with the inorganic salt solution by soaking the SAP into the inorganic salt solution or by spraying the inorganic salt solution onto the SAP, it is difficult to check the exact amount of the inorganic salt solution absorbed into the SAP.

Therefore, in order to secure the reliability of the dehumidifying element, the amount of the inorganic salt absorbed into the SAP has to be controlled with precision and the mixing ratio between the SAP and the inorganic salt has to be uniformly maintained. To this end, a new method for preparing a dehumidifying element using superabsorbent polymer is highly in demand.

BRIEF DESCRIPTION OF THE INVENTION

Therefore, an object of the present invention is to provide a method for preparing a dehumidifying element including superabsorbent polymer (SAP), comprising: mixing SAP particles with inorganic salt particles; exposing the SAP particles and the inorganic salt particles to high humidity environment and thus allowing the SAP to absorb the inorganic salt dissolved due to the high humidity; and drying the water inside the SAP absorbed along with the inorganic salt.

In the method, inorganic salt particles instead of inorganic salt solution are mixed with the SAP particles by a certain ratio, thereby ensuring a uniform mixture of the inorganic salt particles and the SAP particles. Also, since the SAP absorbs the inorganic salt dissolved by absorbing moisture when the salt particles are in close contact with the SAP particles, the amount of the inorganic salt absorbed into the SAP can be controlled with precision. Moreover, since the SAP does not become a hydrogel state after the SAP absorbs the inorganic salt, preparation time for drying the SAP is greatly reduced.

In the step of mixing, the inorganic salt particles and the SAP particles are put into a chamber with a preset ratio and then the chamber is agitated.

In the step of absorbing, the mixture of the inorganic salt particles and the SAP particles is exposed to high humidity environment for a certain time. As a result, the inorganic salt particles absorb moisture from the air thus to deliquesce. Once the inorganic salt particles deliquesce, they are absorbed immediately by adjacent SAP particles, thereby causing ion exchange therebetween. Herein, the high humidity environment can be realized by supplying moisture into the chamber such as by using a humidifier.

In the step of drying, the SAP particles which have absorbed inorganic salt are exposed to high temperature and dry environment. That is, the chamber is heated so as to maintain a temperature higher than a certain degree or is exposed to a heat emitting lamp. As a result, the moisture absorbed by the SAP is evaporated to obtain highly hygroscopic polymers.

The SAP can be selected at least one among cross-linked polymers such as polyacrylic acid, polyacryl amide, polymethacrylic acid, polyvinyl alcohol, propfpolymer of starch, and cellulose derivatives, and copolymers between them.

The inorganic salt can be selected at least one from metal chlorides such as lithium, magnesium, calcium, zinc, aluminum, etc., and halides such as bromide, iodide, etc.

The mixing ratio between the SAP and the inorganic salt has to be set so that the absorbed moisture does not flow as liquid during the dehumidifying process after the SAP is converted into a dehumidifying element by ion exchange. Herein, the maximum mixing ratio between the SAP and the inorganic salt is varied depending on the kinds of both the SAP and the inorganic salt. Preferably, the mixing ratio between the SAP and the inorganic salt is in a range of 1:0.1 to 1:5.

The moisture-absorption speed of the dehumidifying element having super absorbent polymer is largely varied according to a particle size of the SAP. The particle size of the SAP prior to ion exchange is preferably in a range of 0.1 μm to 1000 μm, more preferably, 10 μm to 100 μm, in order to induce a fast dehumidifying process.

The dehumidifying element can be used as a contained form in a container as a particle or as a coated form onto a surface of a thin plate or sheet.

To achieve these and other advantages and in accordance with the purpose of the present invention, as embodied and broadly described herein, there is provided another method for preparing a dehumidifying element including superabsorbent polymer (SAP), comprising: coating SAP particles onto a surface of a sheet; distributing inorganic salt particles on the coated SAP particles; exposing the sheet to a high humidity atmosphere for a certain time and thus allowing the dissolved inorganic salt to be absorbed into the SAP by the process of ion exchange; and drying the sheet.

Preferably, the sheet is formed of natural fiber, artificial fiber, or composite fiber therebetween, and has a structure of textile, mesh, bonded fabric, etc.

To achieve these and other advantages and in accordance with the purpose of the present invention, as embodied and broadly described herein, there is also provided an apparatus for preparing a dehumidifying element, comprising: a chamber for containing superabsorbent polymer (SAP) particles and inorganic salt particles; at least one passageway opened and closed to be connected to the inside of the chamber; an agitator introduced in the chamber for agitating the mixture of SAP particles and inorganic salt particles; a blower for blowing humid air or hot and dry air through the passageway; and a switching valve for selectively opening and closing the passageway so as to separate the chamber from outside.

According to another embodiment of the present invention, the apparatus for preparing a dehumidifying element comprises: a conveyor for transferring a mixture of superabsorbent polymer (SAP) particles and inorganic salt particles; a storage container for containing the SAP particles and the inorganic salt particles and distributing the mixture onto the conveyor with a certain rate; a humidifier for blowing moisture to the mixture moving on the conveyor; a drier for drying the mixture; and a crusher for crushing the mixture that has passed through the drier.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a preferred embodiment of the present invention will be explained in more detail with reference to the attached drawing.

Figure 1:
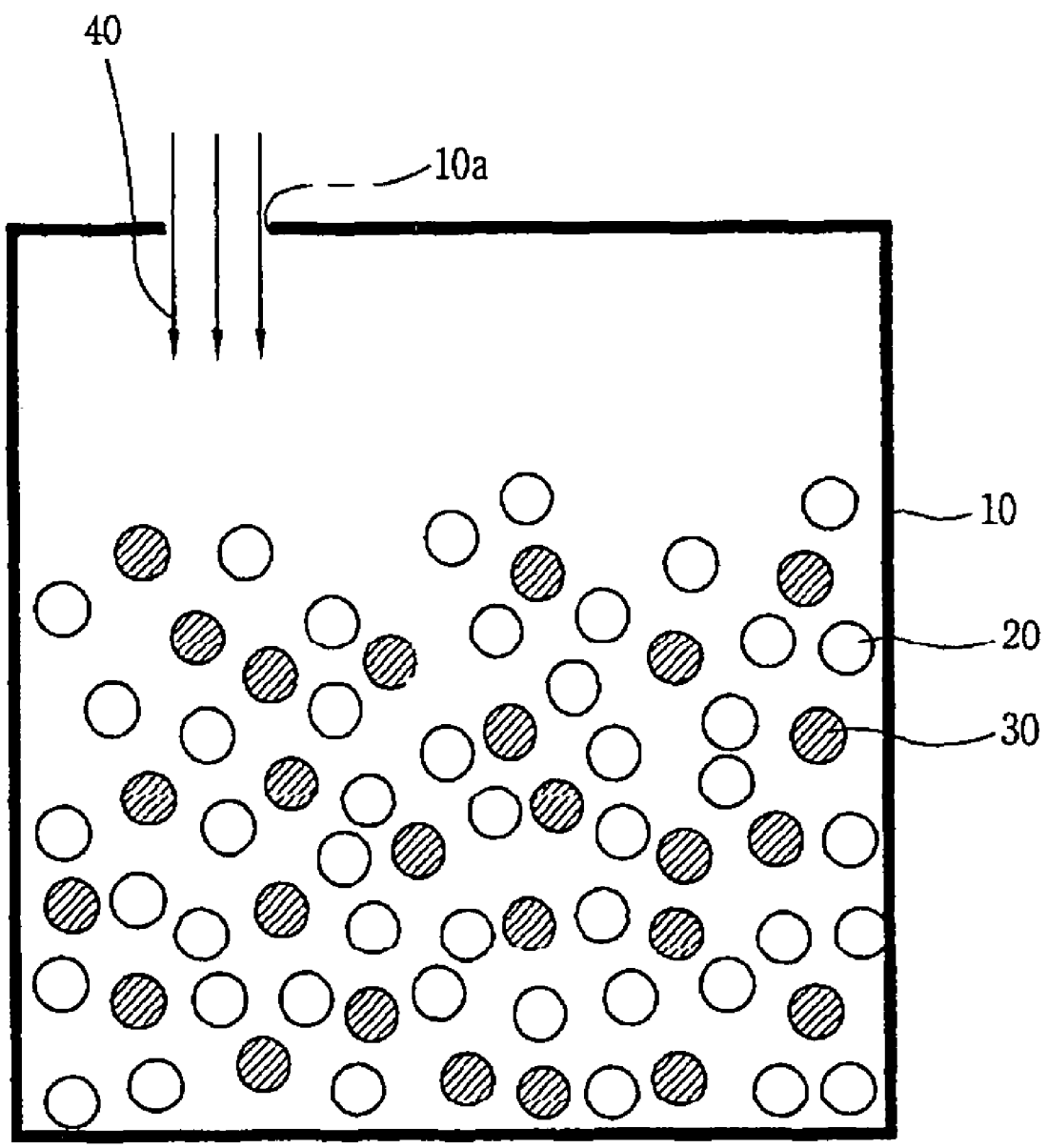
FIG. 1 is a schematic view showing an apparatus for preparing a dehumidifying element according to the present invention.
Figure 2:
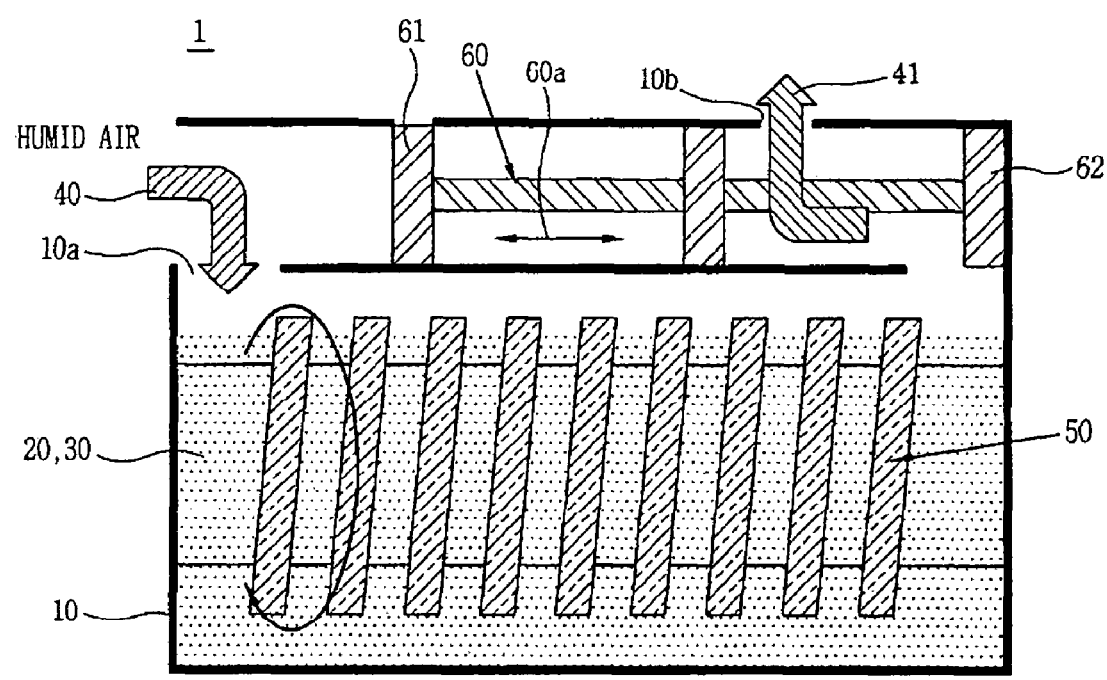
FIGS. 2 and 3 are schematic views showing a construction and an operation of the apparatus for preparing a dehumidifying element according to a first embodiment of the present invention.
Figure 3:
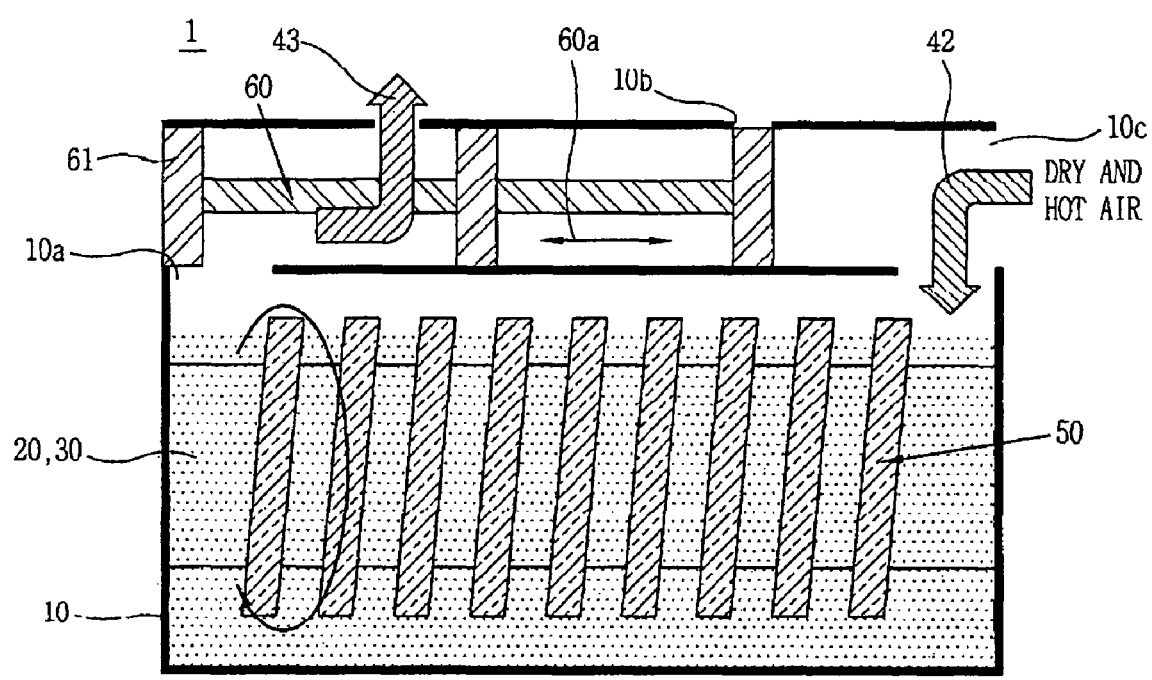
Figure 4:
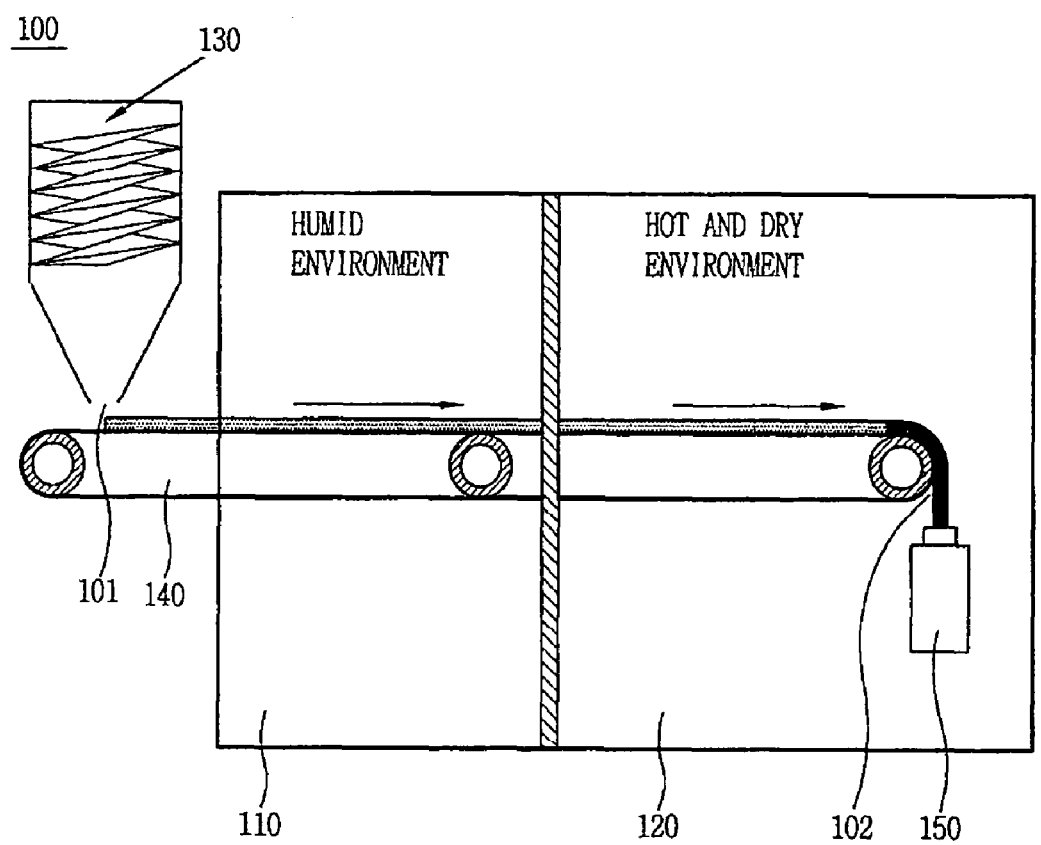
FIGS. 4 and 5 are schematic views showing the construction and the process of the apparatus for preparing a dehumidifying element according to another embodiment of the present invention.
Figure 5:
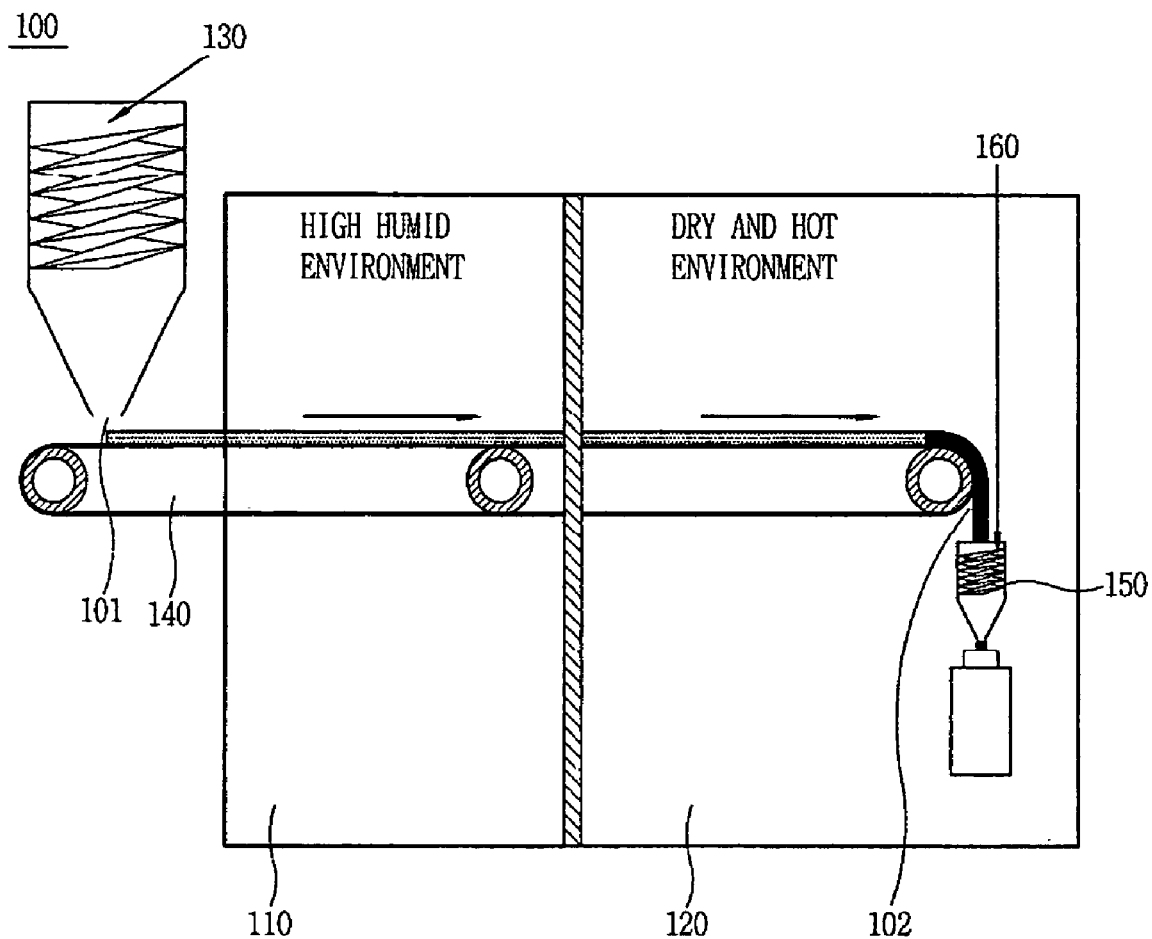

FIG. 1 is a schematic view showing an apparatus for preparing a dehumidifying element according to the present invention, FIGS. 2 and 3 are schematic views showing the construction and the process of the apparatus for preparing a dehumidifying element according to a first embodiment of the present invention, and FIGS. 4 and 5 are schematic views showing the construction and the process of the apparatus for preparing a dehumidifying element according to another embodiment of the present invention.

As shown, superabsorbent polymer (SAP) particles 20 having an approximate size of 50 μm, and inorganic salt particles 30 having an approximate size of 30 μm are put into a chamber 10 with a mass ratio of 1:1. Then, the SAP particles 20 and the inorganic salt particles 30 are mixed to each other in the chamber 10 by an agitator 50. Then, humid air 40 is supplied into the chamber 10 through an opening 10a by using a humidifier, so that the inorganic salt particles 30 absorbs the humid air thus to deliquesce. At the same time, the SAP particles closely contacting the inorganic salt particles 30 absorb the dissolved inorganic salt thus to perform ion exchange.

When the SAP absorbs the inorganic salt thus to be converted into a dehumidifying element having a high hygroscopic property, as shown in FIG. 3, a valve 60 is moved to the left side in the direction 60 thus to close a first opening 10a of the chamber 10 and to open a second opening 10c of the chamber 10. Then, hot and dry air 42 is blown into the chamber 10 through the second opening 10, thereby drying the dehumidifying element to remove the absorbed moisture.

The dehumidifying element of the present invention can be prepared not only by the aforementioned apparatus 1 for preparing a dehumidifying element but also by an apparatus 100 for preparing a dehumidifying element shown in FIGS. 4 and 5.

That is, the SAP particles 20 having an approximate size of 50 μm, and the inorganic salt particles 30 having an approximate size of 40 μm are mixed together in a ratio of 1:1. Then, the mixture is put into a storage container 130. Next, the mixture of the SAP particles 20 and the inorganic salt particles 30 contained in the storage container 130 is distributed onto the conveyor 140 on a certain rate. Then, the conveyor 140 is driven so that the mixture sequentially can pass through the humidifier 110 and the hot air drier 120.

While the mixture between the SAP 20 and the inorganic salt 30 passes through the humidifier 110, the inorganic salt particles 30 absorb humidity in the air thus to deliquesce. At the same time, the SAP particles that are in close contact with the inorganic salt particles 30 absorb the dissolved inorganic salt thus to generate an ion-exchange. Once the SAP is converted into a dehumidifying element having a high hygroscopic property after absorbing the inorganic salt, the conveyor 140 is moved thereby moving the mixture to the hot air drier 120. Then, the mixture is dried in the hot air drier 120, thereby completing the preparation of the dehumidifying element having a high hygroscopic property. The fabricated dehumidifying element 102 is collected into a collector 150.

As shown in FIG. 5, a crusher 160 for crushing the prepared dehumidifying element 102 having a high hygroscopic property into pieces having a proper size can be additionally installed at one end of the conveyor 140.

The prepared dehumidifying element can absorb moisture with an amount of several times of its weight. For instance, a hygroscopic capacity by the dehumidifying element in a condition of 50% of a relative humidity is more than 100%, which corresponds to more than four times of a hygroscopic amount by a silica gel in the same condition.

In the conventional preparation method for a dehumidifying element, ion exchange is performed by contacting an SAP to an inorganic solution or by adding the inorganic salt to the SAP during a polymerization process. Therefore, the degree of the ion exchange is determined by the hygroscopic property of the SAP for the inorganic solution or the reaction property of the SAP during the polymerization process not by an amount of the inorganic salt. However, in the present invention, the SAP comes in contact with the inorganic salt particles thus to perform an ion exchange. Therefore, the mixing ratio between the SAP and the inorganic salt can be controlled with precision. Since the degree of the ion exchange determines the hygroscopic property of SAP, the hygroscopic property of SAP can be freely controlled by precisely controlling the degree of the ion exchange.

Furthermore, since the SAP particles and the inorganic salt particles are mixed together in a chamber by agitating them, they are mixed together uniformly, not partially.

As aforementioned, the preparation method for a dehumidifying element including a superabsorbent polymer (SAP) comprises mixing SAP particles with inorganic salt particles, exposing the SAP particles and the inorganic salt particles to a high humidity environment, thereby absorbing the deliquescent inorganic salt by the SAP and drying the moisture inside the SAP that has absorbed the inorganic salt. Accordingly, the amount of the inorganic salt absorbed by the SAP can be controlled with accuracy, and thus, the degree of an ion exchange therebetween can be also controlled with accuracy, thereby freely controlling a hygroscopic property of the dehumidifying element including the SAP.

Furthermore, according to the present invention, since the SAP particles and the inorganic salt particles are physically mixed together, the mixture ratio therebetween is entirely uniform, and therefore, reliability of the product can be obtained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for preparing a dehumidifying element comprising the steps of:
   (A) coating super absorbent polymer (SAP) particles having a particle size in the range of from 10 μm to 100 μm onto a surface of a sheet, wherein said SAP is cross-linked and is selected from the group consisting of polyacrylic acid, polyacrylamide, polymethacrylic acid, polyvinyl alcohol, graft polymer of starch, cellulose derivatives, and copolymers of the foregoing;
   (B) then distributing undissolved inorganic salt particles onto the SAP particles coated on said sheet, wherein said undissolved inorganic salt particles are selected from the group consisting of magnesium halide, calcium halide, zinc halide, lithium halide, aluminum halide, and mixtures thereof;
   (C) then exposing said coated sheet to a high humidity atmosphere comprising water vapor dispersed in air for a predetermined time, whereby the inorganic salt particles are absorbed into the SAP particles by ion exchange; and
   (D) then drying the sheet at elevated temperature;
   wherein the mixing ratio of the SAP particles to the undissolved inorganic salt particles is in the range of from 1:0.1 to 1:5.

2. The method of claim 1 wherein the sheet is formed of natural fiber and/or artificial fiber and has a structure of textile, mesh, bonded fabric, or a combination of the foregoing.

* * * * *